(12) United States Patent
Hadeli et al.

(10) Patent No.: US 10,328,811 B2
(45) Date of Patent: Jun. 25, 2019

(54) SELF-MANAGING CHARGING POLES

(71) Applicant: ABB Schweiz AG, Baden (CH)

(72) Inventors: Hadeli Hadeli, Baden (CH); Adrian Timbus, Dättwil (CH); Martin Naedele, Zürich (CH)

(73) Assignee: ABB Schweiz AG, Baden (CH)

( * ) Notice: Subject to any disclaimer, the term of this patent is extended or adjusted under 35 U.S.C. 154(b) by 190 days.

(21) Appl. No.: 15/247,309

(22) Filed: Aug. 25, 2016

(65) Prior Publication Data
US 2017/0129354 A1   May 11, 2017

Related U.S. Application Data

(63) Continuation of application No. PCT/EP2015/053618, filed on Feb. 20, 2015.

(30) Foreign Application Priority Data

Feb. 25, 2014   (EP) ..................... 14156605

(51) Int. Cl.
*H02J 7/00*          (2006.01)
*B60L 11/18*         (2006.01)
(Continued)

(52) U.S. Cl.
CPC ......... *B60L 11/1825* (2013.01); *B60L 11/184* (2013.01); *B60L 11/1848* (2013.01); *G05B 13/026* (2013.01); *H02J 3/14* (2013.01); *H02J 7/02* (2013.01); *H02J 13/0075* (2013.01); *H02J 7/0013* (2013.01); *Y02B 70/3225* (2013.01);
(Continued)

(58) Field of Classification Search
USPC ........................................................ 320/109
See application file for complete search history.

(56) References Cited

U.S. PATENT DOCUMENTS

| 8,766,595 B2 | 7/2014 | Gaul et al. |
| 2010/0156349 A1 | 6/2010 | Littrell |

(Continued)

FOREIGN PATENT DOCUMENTS

| DE | 102009036816 A1 | 2/2011 |
| DE | 102010064015 A1 | 6/2012 |

(Continued)

OTHER PUBLICATIONS

European Patent Office, International Search Report & Written Opinion issued in corresponding Application No. PCT/EP2015/053618, dated Jun. 1, 2015, 9 pp.

(Continued)

*Primary Examiner* — Samuel Berhanu
(74) *Attorney, Agent, or Firm* — Taft Stettinius & Hollister LLP; J. Bruce Schelkopf

(57) ABSTRACT

A method for planning a charging of an electrical vehicle comprises receiving a request for charging from an electrical vehicle at a charging pole, determining a charging time slot for the electrical vehicle based on the request for charging, scheduling the charging time slot for the electrical vehicle, predicting a load requirement for the charging pole based on the request for charging and the charging time slot, and sending the load requirement to a grid operator supplying the charging pole with electrical power.

19 Claims, 2 Drawing Sheets

(51) Int. Cl.
*H02J 3/14* (2006.01)
*H02J 7/02* (2016.01)
*H02J 13/00* (2006.01)
*G05B 13/02* (2006.01)

(52) U.S. Cl.
CPC ....... *Y02B 90/2653* (2013.01); *Y02T 10/7005* (2013.01); *Y02T 10/7055* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 20/222* (2013.01); *Y04S 30/12* (2013.01); *Y04S 30/14* (2013.01); *Y04S 40/126* (2013.01)

(56) References Cited

U.S. PATENT DOCUMENTS

2012/0146583 A1* 6/2012 Gaul .................. B60L 11/1838
320/109

2014/0191722 A1* 7/2014 Usuki .................. H01M 10/44
320/109

FOREIGN PATENT DOCUMENTS

| | | |
|---|---|---|
| DE | 102011085776 A1 | 5/2013 |
| EP | 2404779 A1 | 1/2012 |
| EP | 2495844 A1 | 9/2012 |
| EP | 2518851 A2 | 10/2012 |
| JP | 2002354609 A | 12/2002 |
| JP | 2007148590 A | 6/2007 |
| RU | 2418693 C2 | 5/2011 |
| WO | 2013053413 A1 | 4/2013 |

OTHER PUBLICATIONS

European Patent Office, Extended Search Report issued in corresponding Application No. 14156605.9, dated Sep. 4, 2014, 4 pp.

* cited by examiner

SELF-MANAGING CHARGING POLES

FIELD OF THE INVENTION

The invention relates to the field of mobility of electric vehicles and smart grid infrastructure, particularly on a demand and supply mechanism between an electric vehicle and an energy supplier. In particular, the invention relates to a method for planning a charging of an electrical vehicle, a charging pole and a charging system.

BACKGROUND OF THE INVENTION

With a high penetration level of electric vehicles, the operation of electrical distribution grids is facing another challenge. Currently, two strategies for charging the electrical vehicles are envisioned:

Slow charging may be used particularly in garages and home parking and may be defined via a maximum charging current limited by the low voltage network infrastructure.

Fast charging may be used at dedicated charging stations and large parking lots in the premises of large office buildings or shopping malls and may be defined via an enhanced charging rate to shorten the charging time and hence the waiting time for charging.

To facilitate the supply of energy, utilities may provide charging poles and/or charging stations for the vehicles. The charging poles may be distributed across large geographical areas and the load on the distribution grid is expected to rise considerably. This will most likely have a consequence on the energy price which may be dependent on the time of charging and on the supply demand ratio.

From a drivers' perspective, the charging time should be as short as possible. With fast charging mechanisms, the charging process is envisioned to take between 10-15 minutes.

DESCRIPTION OF THE INVENTION

With a charging process lasting more than 10 minutes, a driver will usually prefer a better mechanism for planning ahead. It may be more efficient if the driver arrives at the charging pole and have his/her car charged immediately rather than have to queue for a while (in which time perhaps he/she can travel to the next pole). Moreover, the driver may want to optimize the price he/she pays for the electrical energy.

Since the charging process usually consumes a lot of electrical energy, for utility operators and electrical grid operators, it may also be beneficial to have a forecast on the utilization of charging poles.

These objectives are achieved by the subject-matter of the independent claims. Further exemplary embodiments are evident from the dependent claims and the following description.

An aspect of the invention relates to a method for planning a charging of an electrical vehicle. An electrical vehicle may be a car, lorry, truck, motorcycle with an electrical motor that is supplied by an on-board battery, which is adapted to be charged by connecting it to an electrical grid.

According to an embodiment of the invention, the method comprises receiving a request for charging from an electrical vehicle at a charging pole, determining a charging time slot for the electrical vehicle based on the request for charging, scheduling the charging time slot for the electrical vehicle, predicting a load requirement for the charging pole based on the request for charging and the charging time slot, and sending the load requirement to a grid operator supplying the charging pole with electrical power.

For example, the driver of the electrical vehicle may request charging from a charging pole ahead of his travel route. This may be done by a telephone call at a charging station with the charging pole or may be performed by the electrical vehicle itself by establishing a data communication connection to the charging pole and transmitting the request via this connection.

In reaction to the request, the charging pole may determine an energy demand of the electrical vehicle (for example based on a current battery load) and may determine and schedule a charging time slot. A time and duration of the charging time slot may be determined from the energy demand of the electrical vehicle, a loading profile for the electrical vehicle, and/or other charging time slots already stored in the charging pole. The constraints from the grid connection also may be considered for determining the charging time slot, i.e. that not more that a certain amount of power can be transferred through the grid connection infrastructure such as substations or power conversion units.

From a possible loading profile of the battery of the electrical vehicle that may depend on a maximal loading current, for example, the charging pole may determine a load requirement during the charging time slot. Analogously, load requirements during further charging time slots for further vehicles may be predicted. The future load requirement of the charging pole then may be sent to the grid operator, which may then uses this information for better balancing of the grid. On its turn, the grid operator may inform the charging station (a sum of poles) that there are some grid constraints in the area and the charging profile (energy wise, i.e. power & time information) for the station has been changed to secure grid stability.

It has to be understood that a charging time slot may comprise a charging time (i.e. beginning of charging) and a charging duration. Scheduling of a charging time slot may comprise saving the charging time slot (its time and duration) together with further data identifying the electrical vehicle.

According to an embodiment of the invention, the load requirement comprises a required electrical power for a future time interval. For example, the load requirement, which also may be based on charging time slots of further electrical vehicles and/or further charging poles, may comprise several future time intervals, each time interval associated with a specific electrical power for this time interval.

According to an embodiment of the invention, the method further comprises receiving a load requirement from at least one second charging pole, determining the charging time slot based on the load requirement of the second pole. Two or more charging poles may be interconnected to a charging system. For example, all charging poles of a charging station or at a specific geographical area may be communicatively interconnected with each other. The communicatively interconnected charging poles may exchange their load requirements and may determine their charging time slots in such a way that, for example, no load peaks are generated.

According to an embodiment of the invention, an overall load requirement of the first charging pole and the at least one second charging pole is optimized by time shifting the charging time slot and/or adapting the charging profile of the charging time slot to the load requirement of the second pole. For example, a charging pole may only charge one electrical vehicle per time. Thus, a new charging time slot only may be scheduled in a time interval, where no other charging time slots of other vehicles are already scheduled.

However, it is possible to move the charging time of the charging time slot in time to, for example, decrease load peaks generated by all charging poles of the charging system, and/or to enlarge the duration of the charging time slot by reducing the maximal charging current during this charging time slot.

According to an embodiment of the invention, the overall load requirement is optimized such that a maximal load requirement is reduced and/or the overall load requirement is optimized such that timely changes in the overall load requirement are reduced. It has to be understood that the overall load requirement may be the load requirement of the charging system, i.e. the load requirement of the charging poles of the charging system.

By time shifting and/or enlarging specific charging time slots, the maximal load requirement may be reduced, for example by reducing peaks in the load requirement. As an example, a load peak may be reduced by removing some of the charging time slots generating the peak.

Furthermore, for a grid operator it may be beneficial, when the load requirements only change slowly with time. In this case, the balancing of the grid only may have to react slowly. As an example, a time interval with fast varying load requirement may be equalized by time shifting or enlarging charging time slots in the vicinity of steep changes of the load requirement.

According to an embodiment of the invention, the method further comprises redirecting the electrical vehicle to the second charging pole based on the load requirement of the second charging pole. For example, in the case that the first charging pole needs maintenance or a charging action at the first pole has lasted longer than expected, the first pole may determine, whether the second pole has a free charging time slot. If such a charging time slot is present, the electrical vehicle may be directed o the second pole.

According to an embodiment of the invention, the method further comprises exchanging the charging time slot with another charging time slot of the charging pole to optimize the overall load requirement. Two poles may exchange specific charging time slots (which, for example, have a very large timely overlap and/or different charging profiles). For example, when the second pole is adapted for charging with a higher maximal current as the first pole, the charging time slot at the first charging pole may be exchanged with the one of the second charging pole, to provide a faster charging at the second charging pole. In this case, the load requirement of the charging system may be increased during the charging time slot.

According to an embodiment of the invention, the request for charging comprises at least one of a current position of the electrical vehicle, a current speed of the electrical vehicle, a battery level of the electrical vehicle, a battery size of the electrical vehicle, an expected arrival time of the electrical vehicle, a destination of the electrical vehicle. The request for charging may contain data present in the electrical vehicle that may be useful for determining a charging time slot.

With the current position and/or the current speed, the time of arrival of the electrical vehicle at the charging pole may be determined. It is also possible that the time of arrival is determined by the electrical vehicle itself, for example with corresponding navigation software.

With the battery level and the battery size, the energy demand and/or the maximal possible charging rate for the electrical vehicle may be determined.

The destination of the electrical vehicle (for example provided by a navigation software) may be used for determining possible alternative charging poles, for example, when charging time slots are exchanged between charging poles.

In the following, in particular, the communication between the charging pole and the electrical vehicle is discussed. As the charging of an electrical vehicle may last longer than filling a vehicle with liquid fuel, the time, duration and/or prize of the charging may be (automatically) negotiated between the electrical vehicle and the charging pole, before the electrical vehicle arrives at the charging pole.

According to an embodiment of the invention, the method further comprises sending a response for charging with a charging time to the electrical vehicle, receiving an agreement for charging from the electrical vehicle, scheduling the charging time slot after receiving the agreement. It has to be noted that all these steps, as well as the receiving of the request for charging, may take place before the electrical vehicle arrives at the charging pole.

According to an embodiment of the invention, the method further comprises reserving the charging time slot for charging for a predefined duration, after sending the response for charging. For example, the charging time slot may be freed, when the charging pole does not receive an agreement for charging from the electrical vehicle.

According to an embodiment of the invention, the response for charging comprises at least one of the charging time slot, a charging time, a charging duration, an estimated arrival time, a price for charging. In the response for charging all relevant data for the electrical vehicle and/or its driver may be encoded. In particular, the driver may compare the charging time, duration and/or prize with offers (response for charging) of other charging poles, and, for example, may decide, whether he wants to spare money or wants to spare time during charging.

According to an embodiment of the invention, the request for charging, a response for charging and/or an agreement for charging are transmitted between the charging pole and the electrical vehicle via a data communication network. For example, these data may be transmitted via Internet and/or GPRS.

According to an embodiment of the invention, the method further comprises offering a chain of charging poles along a route of the electrical vehicle. It also may be possible that further charging poles along the route of the vehicle (for example determined from the destination of the vehicle) are included into the offer. In such a way, also the grid balancing, the charging duration and/or the charging prize may be optimized.

For example, the electrical vehicle is not completely charged at the first charging pole, since the energy suffices to reach the second charging pole and the charging at the second pole may result in an overall lower load requirement of the charging system comprising the two poles.

A further aspect of the invention relates to a charging pole. It has to be noted that a charging pole may be any device adapted for charging an electrical vehicle. For example, the charging pole may be integrated in the wall of a building. However, usually, a charging pole has a pole-shaped housing providing an interface to the vehicle for exchanging data/and or supplying electrical energy.

According to an embodiment of the invention, the charging pole comprises a charging device for charging an electrical vehicle, a communication device adapted for communication with an electrical vehicle and an operator of an electrical grid supplying the charging pole with electrical energy, and a computing device adapted for controlling a charging of the electrical vehicle via the charging device. All these components may be integrated into the housing of the charging pole.

According to an embodiment of the invention, the computing device is adapted for performing the method as described in the above and in the following. I.e. the charging pole may be adapted for negotiating a charging time, duration and/or prize with a remote electrical vehicle. Furthermore, the charging pole may be adapted for exchanging data with other charging poles for optimizing an overall load requirement of the charging poles.

A further aspect of the invention relates to a charging system comprising a plurality of such charging poles that are communicatively interconnected via a data communication network.

For example, a charging station may comprise the charging system of self-managing poles and therefore does not need any further central computing device. It also may be possible that all charging poles along a street or motorway are interconnected in such a way, for example for optimizing the waiting time at the charging poles.

It has to be understood that features of the method as described in the above and in the following may be features of the charging pole and/or the charging system as described in the above and in the following and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
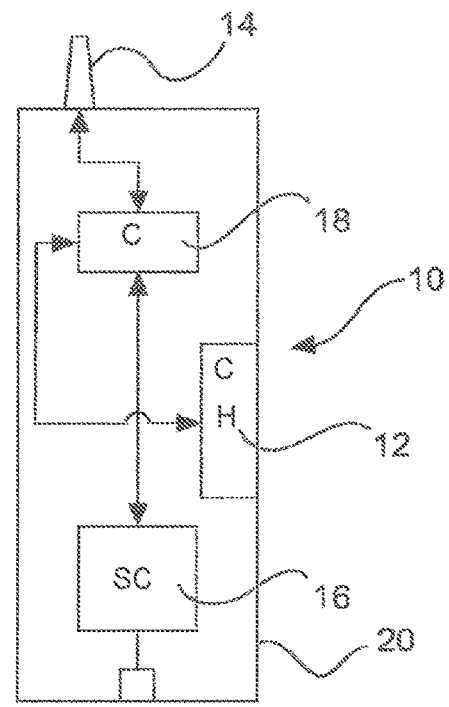
FIG. 1 schematically shows a charging pole according to an embodiment of the invention.

FIG. 1 shows an intelligent charging pole (CP) 10 comprising a charging device 12 for charging an electrical vehicle. The intelligent charging pole 10 also may be adapted for receiving information from the electrical vehicle, when the electrical vehicle is connected to the charging device (CH) 12. For example, the current battery level may be received in such a way.

The charging pole 10 comprises furthermore a first communication device 14 adapted for remote communication with the electrical vehicle and a second communication device (SC) 16 adapted for remote communication with an operator of an electrical grid supplying the charging pole 10 with electrical energy and with other equivalent charging poles. Remote communication may mean that the electrical vehicle, the operator and/or the other charging pole may be remote from the charging pole 10, for example more than 10 m or even more than 10 km.

A computing device (C) 18 adapted for controlling a charging of the electrical vehicle via the charging device 12 and for receiving and/or sending data via the two communication devices 14, 16 may be seen as a landlord of the charging pole 10. The computing device 18 may monitor in real-time the performance of the charging pole 10 and/or may coordinate actions with the other charging poles.

All components 12, 14, 16, 18 of the charging pole 10 may be assembled into one housing 20, such that the charging pole 10, besides its charging capability, also provides remote communication channels to the electrical vehicle and the grid operator as well as intelligence for optimizing its load requirements.

Figure 2:
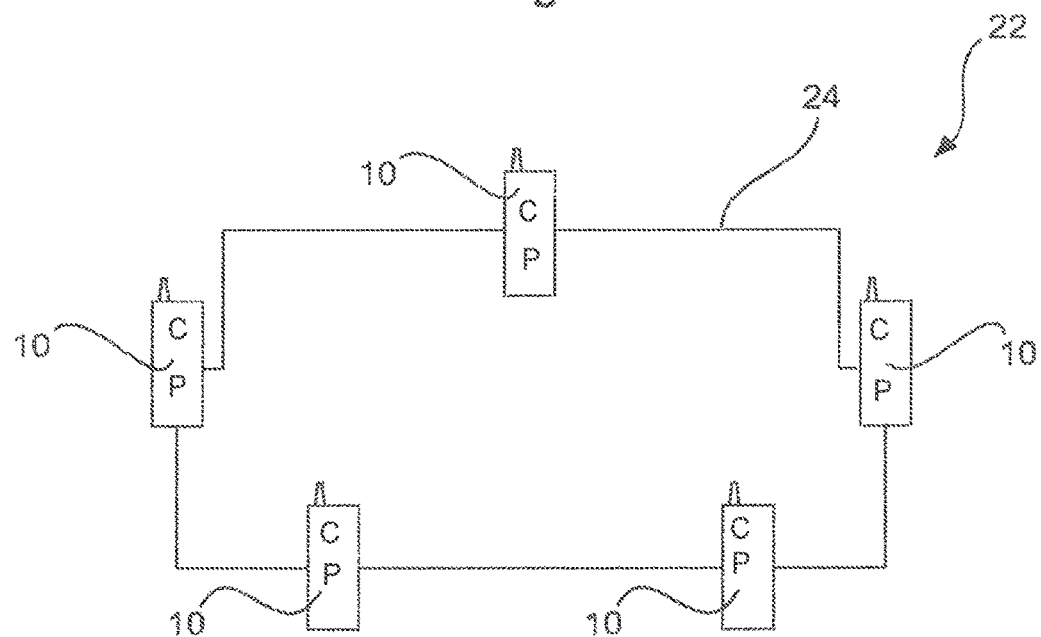
FIG. 2 schematically shows a charging system according to an embodiment of the invention.

FIG. 2 shows that a plurality of charging poles 10 may be communicatively interconnected via a data communication network 24 to form a charging system 22. For example, to enable the coordination between charging poles 10, the charging poles 10 may be connected one to each other (for instance, using a ring network).

Figure 3:
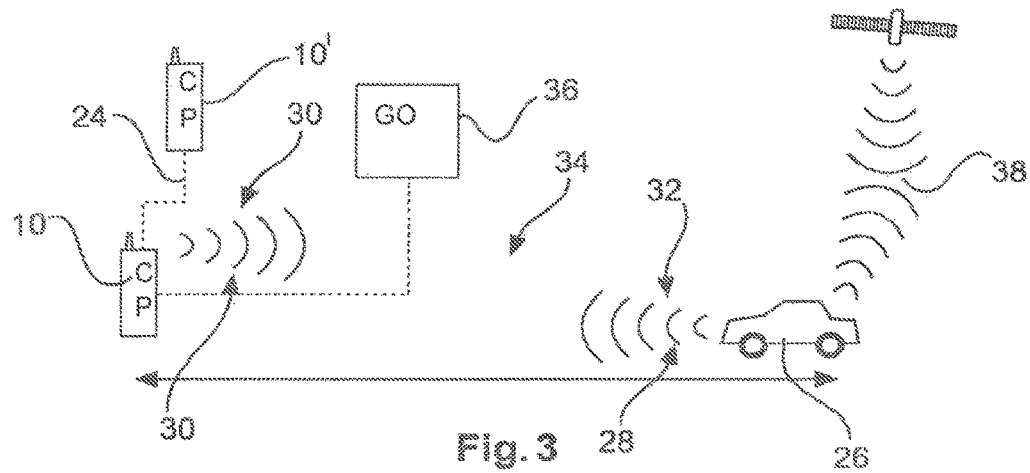
FIG. 3 shows a schematic diagram explaining a method for planning the charging of an electrical vehicle according to an embodiment of the invention.

FIG. 3 shows a diagram illustrating the communication between an electrical vehicle 26 and a charging pole 10, when the electrical vehicle 26 may be remote from the charging pole 10. Such a communication may enable a customer (a driver of the electrical vehicle 26) to arrive in time and/or the electrical vehicle 26 be charged in time. The waiting time of the customer at the charging station may be minimized as much as possible.

In a first step, the electrical vehicle 26 sends a request for charging 28 to the charging pole 10. The electrical vehicle 26 may propagate the request for charging by using different means of communication such as a wireless data communication network 34 like GPRS communication, Internet, etc.

The request for charging 28 may comprise a current position of the electrical vehicle 26, a current speed of the electrical vehicle, a battery level of the electrical vehicle, a battery size of the electrical vehicle, an expected arrival time of the electrical vehicle and/or a destination of the electrical vehicle. For example, the position of the vehicle may be determined by a positioning service 38, like GPS.

In the next step, the request for charging 28 is received at the charging pole 10. The charging pole 10 manages to respond to the request for charging 28 from the electrical vehicle 26. The charging pole 10 calculates the necessary information to form a response for charging 30. The calculation may be based on (but is not limited to) available committed agreements for charging from other customers/electrical vehicles, available stored energy, energy price at that time, availability of charging poles, etc.

In particular, the charging pole 10 determines a charging time slot 40 (see FIG. 4) for the electrical vehicle 26 based on the request for charging 28 and the above mentioned information.

Figure 4:
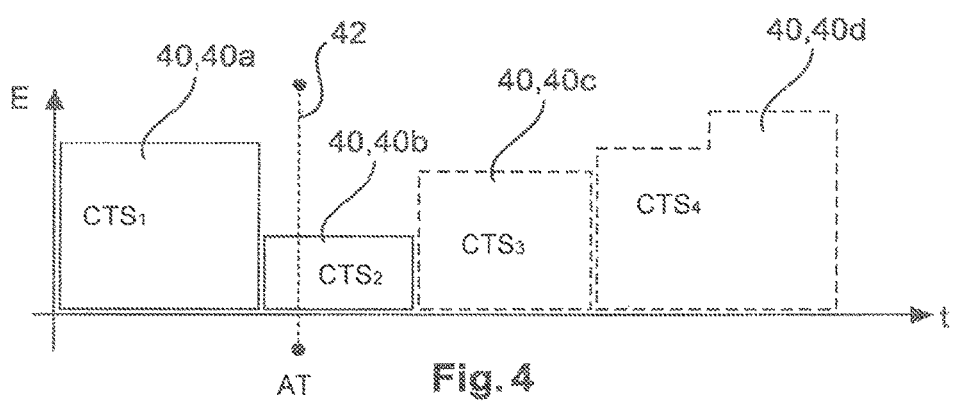
FIG. 4 shows a diagram with charging time slots used in a method for planning the charging of an electrical vehicle according to an embodiment of the invention.

FIG. 4 shows a diagram with charging time slots ($CTS_1$-$CTS_4$) 40a, 40b, 40c, 40d that are arranged one after the other over the time t. Each of the charging time slots 40a, 40b, 40c, 40d are associated with an electrical vehicle 26 and have a starting time, charging duration and end time.

The charging time slots 40a and 40b are scheduled slots. When the charging pole receives the agreement for charging 32, it blocks the needed slot 40a, 40b until the arrival time of the electrical vehicle 26 (plus an optional additional buffer to balance an unwanted delay of the arrival of the electrical vehicle 26). If the buffer time is passed, a scheduled slot may be released.

The actual time (AT) 42 falls within the charging time slot 40*b*. The electrical vehicle 26 associated with the charging time slot 40*b* is currently charged.

The charging time slots 40*a* and 40*b* are reserved slots. When the charging pole 10 generates the response for charging 30, it temporarily blocks the needed slot 40*a*, 40*b* until the expiration time of the response for charging 30.

The diagram also shows the amount of electrical energy E needed for charging the respective vehicle 26. Every charging time slot 40*a*, 40*b*, 40*c*, 40*d* is associated with the energy needed for charging the respective vehicle. Based on this information, the charging pole 10 may calculate the amount of energy needed for the next near future.

In general, a charging time slot 40 may also have a charging profile, i.e. the charging power over time need not be constant over the complete charging time slot, as indicated in FIG. 4 with respect to charging time slot 40*d*.

Already for determining the begin and the end of the charging time slot 40, the charging pole 10 may take information from other charging poles 10' into consideration. The charging pole 10 may receive a load requirement from at least one second charging pole 10'. In the situation where there is more than one charging pole 10 available in a close region (or in one general location), the charging poles 10, 10' may self-manage themselves in creating a better load profile for the grid operator (GO) 36.

For example, the charging time slot 40 may be determined based on the load requirement of the second pole 10'. An overall load requirement of the first charging pole 10 and the second charging pole 10' may be optimized by time shifting the charging time slot 40 and/or adapting the charging profile of the charging time slot 40 to the load requirement of the second charging pole 10'.

In this case, the overall load requirement may be optimized such that a maximal load requirement is reduced and/or the overall load requirement may be optimized such that timely changes in the overall load requirement are reduced.

Turning back to FIG. 3, the response for charging 30 may comprise the charging time slot 40, a charging time, a charging duration, an estimated arrival time, possible earliest starting time, a price for charging, etc.

In the end, the charging pole sends the generated response for charging 30 to the electrical vehicle 26.

It may be possible that the charging pole 10 reserves the charging time slot 40 for charging for a predefined duration (for example 90 seconds), after sending the response for charging 30, in order to receive an agreement of charging 32.

When the customer, driver and/or the electrical vehicle agrees the electrical vehicle 26 generates agreement of charging 32 and send it to the charging pole 10, which then receives the agreement for charging 32 from the electrical vehicle 10. In this case, the charging pole 10 schedules the charging time slot 40 until the arrival time of the electrical vehicle 26 plus an optional buffer time.

Also the response for charging 30 and/or the agreement for charging 32 may be transmitted between the charging pole 10 and the electrical vehicle 26 via the data communication network 34.

Note that the request for recharging 32 from a customer/driver may as well be passed to the charging pole 10 via another way, for instance, via telephone directly to an operator of the charging pole 10.

As an example, assume that the electrical vehicle 26 is at a distance of 10 km from the charging pole 10. From a search through a mean of communication (such as a mobile device, GPS, etc.), the driver/customer finds the charging pole 10 and then sends out the request for charging 28 to the charging pole 10. Upon receiving the request for charging 28, the charging pole 10 extracts the necessary information, does some calculation, generates the response for charging 30 and sends it back to the electrical vehicle 26. After considering the response for charging 30 from the charging pole 10, the customer/driver commits to the offer by sending an agreement for charging 32 to the charging pole 10.

As another example, if the customer/driver does not agree to the response for charging 30, he can simply do nothing. If the customer/driver fails to respond to the response for charging 30 before the offer expiry time, than even if the customer/driver sends the agreement for charging 32, the agreement for charging 32 may be declined and a new response for charging 30 may be sent out to the electrical vehicle 26 for further response.

Furthermore, it is possible that the charging pole 10 offers a chain of charging poles 10, 10' along a route of the electrical vehicle 26. For example, a customer is going to town X which is 500 km away from the current charging pole 10. The charging pole 10 may offer a contract to the customer/driver that he can get a recharge along the way on the next 90 km, 200 km, 280 km, 390 km, 490 km, assuming that the maximum travelling distance with a full charge is 130 km. The contract may as well give an attractive energy price and as well flexibility or priority in getting recharge.

Figure 5:
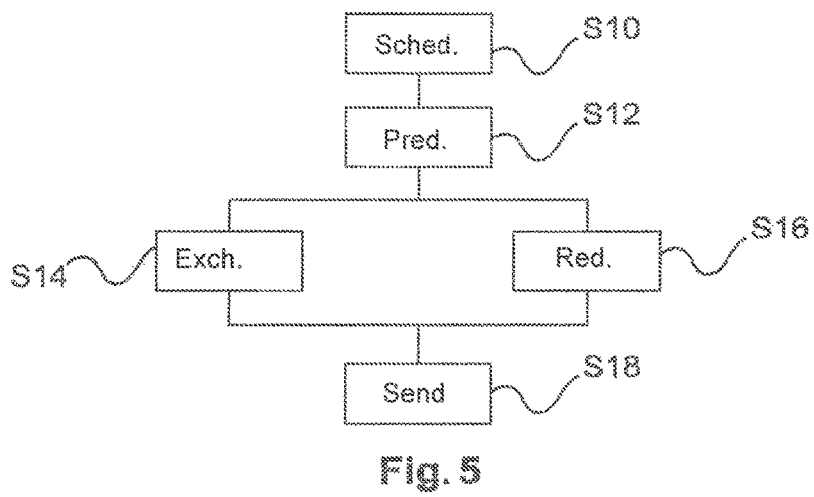
FIG. 5 shows a flow diagram for a method for planning the charging of an electrical vehicle according to an embodiment of the invention.

FIG. 5 shows a flow diagram for a method that may start after the electrical vehicle has agreed with the response for charging 30.

In step S10, the charging time slot 40 is scheduled (Sched.) after receiving the agreement for charging 32. The charging time slot 40 may be scheduled for the electrical vehicle 26 until the beginning of the next charging time slot of the next vehicle.

In step S12, the charging pole predicts (Pred.) a load requirement for the charging pole 10 based on the request for charging 28 and the charging time slot 40. In particular, all future scheduled and optionally reserved charging time slots 40 may be used for calculating the load requirement. The load requirement may comprise a required electrical power and/or energy for a future time interval.

It is also possible, that several poles 10, 10' may optimize the overall load requirement by moving charging time slots in time and between them. The charging pole 10 may coordinate with other nearby charging poles 10' (for example in one central charging station) in creating a better load profile/requirement.

This may be particularly useful when there are several charging poles 10, 10' in a close distance area or in a complete charging station. One additional service that may be provided to the customer/driver may be a short waiting and/or charging time. The waiting time for the customers/drivers may be minimized by allocating electrical vehicles 26 to the charging poles 10, 10' based on the amount of energy to be charged and as well to distribute the load requirement as such that the load requirement is automatically distributed amongst the charging poles 10, 10'.

In addition, the coordination mechanism of the charging poles 10, 10' may as well combine different charging profiles to optimize the load distribution.

It has to be noted that the coordination mechanism may be alternatively performed by a centralized coordination system or distributed coordination system.

Note that, although the charging pole 10 may accurately calculate the needed charging time, in practice, the real charging time may be different from the theoretical calculation. This may be due to different other factors, such as tardiness of the customer, problem in the electricity load, etc. The finishing time of the charging may be earlier or later. The coordination mechanism may also take this real-time information into consideration, when re-shuffling the load of the charging poles 10, 10'.

For example, in step S14, the charging pole 10 exchanges (Exch.) the charging time slot 40c with another charging time slot 40d of the charging pole 10 to optimize the overall load requirement.

Such an automated re-shuffling of committed and uncommitted schedules in order to create an equalized load profile may be performed under the constraint that the committed offers to the customers/drivers are not sacrificed. Or, if sacrificing has to be made, a fair compensation may be offered to the customer/driver (for instance, a reduction in price).

As another example, in step S16, the electrical vehicle 10 may be redirected (Red.) to the second charging pole 10' based on the load requirement of the second charging pole 10'. For example, automated re-shuffling may include automated allocation of charging poles 10 for quick charging (less energy needed per car) and heavy charging.

Furthermore, load may be automatically shifted when either a charging pole 10 is out-of-service or is put (or back)-in-service. For instance, by observing the load profile/requirement and coordination with the other charging poles, a charging pole 10 may decide on the time for out-of-service to conduct a maintenance operation. Similarly, when the maintenance activity is done, the charging pole 10 may simply join the service team again to provide service for electrical vehicles.

In step S18, the determined (overall) load requirement is sent (Send) to the grid operator 36, which supplies the charging poles 10, 10' with electrical power.

Based on the agreement for charging 32, the charging poles 10 may predict with a certain probability the load requirement in the near future. In addition, for a smooth operation, the charging pole 10 may schedule the charging time of the electrical vehicle 26 so that combination of multiple charging operations may create a one bulk (continuous) request. Having one bulk request for energy may be better (in operational term) rather than having multiple intermittent energy drawing from the distribution grid.

In addition to that, by having this capability, the pole can manage itself on where to be in the service or out of service for maintenance or other purpose.

With the method and the system 22, a grid operator 36 may have a more accurate picture on the load requirement at the area that the operator 36 serves. By having a better load prediction, the grid operator 36 may be able to make a better planning in purchasing or producing electricity. Thus, at the end, cost may be reduced and income may be maximized.

The computing device 18 of the charging pole 10 may be seen as agent sitting on the charging pole 10 and acting as a manager of the charging pole 10. The charging pole 10 may become more intelligent by having the ability to schedule load consumption, may provide better load requirement forecast for the grid operator 36. The system 22 may enable further coordination between different charging poles 10, 10' in the area under the same grid operator 36. The coordination between charging poles 10, 10' may result in a better load balance in the electrical grid. The coordination may be beneficial, particularly when there is nobody at a charging station (during midnight time), or at an unmanned charging station and/or charging pole 10, 10'.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10, 10' charging pole
12 charging device
14 communication device
16 communication device
18 computing device
20 housing
22 charging system
24 data communication network
26 electrical vehicle
28 request for charging
30 response for charging
32 agreement for charging
34 communication network
36 grid operator
38 positioning service
40 charging time slot
40a, 40b, 40c, 40d charging time slot
42 actual time

The invention claimed is:

1. A method for planning a charging of an electrical vehicle, the method comprising:
   receiving a request for charging from an electrical vehicle at a first charging pole;
   determining a charging time slot for the electrical vehicle based on the request for charging;
   scheduling the charging time slot for the electrical vehicle;
   predicting a load requirement for the first charging pole based on the request for charging and the charging time slot;
   receiving a load requirement from at least one second charging pole;
   exchanging the charging time slot with another charging time slot of the at least one second charging pole to optimize an overall load requirement;
   sending the load requirements to a grid operator supplying the first charging pole and the at least one second charging pole with electrical power.

2. The method of claim 1,
   wherein the load requirement comprises a required electrical power for a future time interval.

3. The method of claim 1, further comprising:
   determining the charging time slot based on the load requirement of the second pole.

4. The method of claim 1,
wherein the overall load requirement of the first charging pole and the at least one second charging pole is optimized by time shifting the charging time slot or adapting the charging profile of the charging time slot to the load requirement of the second charging pole.

5. The method of claim 1,
wherein the overall load requirement is optimized such that a maximal load requirement is reduced; or
wherein the overall load requirement is optimized such that timely changes in the overall load requirement are reduced.

6. The method according to claim 1, further comprising:
redirecting the electrical vehicle to the second charging pole based on the load requirement of the second charging pole.

7. The method of claim 1,
wherein the request for charging comprises at least one of a current position of the electrical vehicle, a current speed of the electrical vehicle, a battery level of the electrical vehicle, a battery size of the electrical vehicle, an expected arrival time of the electrical vehicle, and a destination of the electrical vehicle.

8. The method of claim 1, further comprising:
sending a response for charging with a charging time to the electrical vehicle;
receiving an agreement for charging from the electrical vehicle;
scheduling the charging time slot after receiving the agreement for charging.

9. The method of claim 7, further comprising:
reserving the charging time slot for charging for a predefined duration, after sending the response for charging.

10. The method of claim 8,
wherein the response for charging comprises at least one of the charging time slot, a charging time, a charging duration, an estimated arrival time, and a price for charging.

11. The method of claim 1,
wherein at least one of the request for charging, a response for charging or an agreement for charging are transmitted between the charging pole and the electrical vehicle via a data communication network.

12. The method of claim 1, further comprising:
offering a chain of charging poles along a route of the electrical vehicle.

13. A charging pole, comprising:
a charging device for charging an electrical vehicle;
a communication device adapted for communication with an electrical vehicle and an operator of an electrical grid supplying the charging pole with electrical energy;
a computing device adapted for controlling a charging of the electrical vehicle via the charging device the computing device operable to
receive a request for charging from the electrical vehicle at the charging pole;
determine a charging time slot for the electrical vehicle based on the request for charging;
schedule the charging time slot for the electrical vehicle;
predict a load requirement for the charging pole based on the request for charging and the charging time slot;
receive a load requirement from at least one second charging pole;
exchange the charging time slot with another charging time slot of the at least one second charging pole to optimize an overall load requirement;
send the load requirements to the operator supplying the charging poles with electrical power.

14. A charging system comprising a plurality of charging poles according to claim 13, wherein the charging poles are communicatively interconnected via a data communication network.

15. The method of claim 2, further comprising:
determining the charging time slot based on the load requirement of the second pole.

16. The method of claim 15, wherein an overall load requirement of the first charging pole and the at least one second charging pole is optimized by time shifting the charging time slot or adapting the charging profile of the charging time slot to the load requirement of the second charging pole.

17. The method of claim 16,
wherein the overall load requirement is optimized such that a maximal load requirement is reduced; or
wherein the overall load requirement is optimized such that timely changes in the overall load requirement are reduced.

18. The method according to claim 4, further comprising:
redirecting the electrical vehicle to the second charging pole based on the load requirement of the second charging pole.

19. The method according to claim 5, further comprising:
redirecting the electrical vehicle to the second charging pole based on the load requirement of the second charging pole.

* * * * *